US012687649B2

(12) United States Patent
Liu

(10) Patent No.: US 12,687,649 B2
(45) Date of Patent: *Jul. 21, 2026

(54) METHOD AND APPARATUS FOR ADAPTIVE CROSS-CORRELATION BASED FULL WAVEFORM INVERSION

(71) Applicant: CHINA PETROLEUM & CHEMICAL CORPORATION, Beijing (CN)

(72) Inventor: Xuejian Liu, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 455 days.

This patent is subject to a terminal disclaimer.

(21) Appl. No.: 18/477,464

(22) Filed: Sep. 28, 2023

(65) Prior Publication Data

US 2025/0110249 A1      Apr. 3, 2025

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 1/305* (2013.01); *G01V 2210/614* (2013.01); *G01V 2210/6222* (2013.01)

(58) Field of Classification Search
CPC ........ G01V 1/282; G01V 1/303; G01V 1/305; G01V 2210/614; G01V 2210/6222
See application file for complete search history.

(56) References Cited

U.S. PATENT DOCUMENTS

2016/0238722 A1*   8/2016   Vdovina ................. G01V 1/282
2017/0115418 A1*   4/2017   Gratacos ................. G01V 1/282
(Continued)

FOREIGN PATENT DOCUMENTS

CN       107422379 A       12/2017
CN       114460646 A   *   5/2022   ............. G01V 1/282
CN       117581119 A       2/2024

OTHER PUBLICATIONS

Wang et al., "Inversion of seismic refraction and reflection data for building long-wavelength velocity models" Geophysics, vol. 80, No. 2 (Mar.-Apr. 2015); p. R81-R93 (Year: 2015).*
(Continued)

*Primary Examiner* — John C Kuan
(74) *Attorney, Agent, or Firm* — NKL Law; Allen Xue

(57) ABSTRACT

Method and apparatus for performing a traveltime-based seismic full waveform inversion using the frequency-dependent Hann window and the source-independent scheme to generate a final velocity model of subsurface formations are provided. The method includes positioning seismic data recording sensors in the survey region; blasting at points of incidence in the survey region to generate seismic waves; and sensing and recording the seismic waves using the seismic data recording sensor. The recorded seismic waves are seismic data. The method further includes transmitting the seismic data to a computer system including one or more memories and storing the seismic data in one or more memories; storing a source wavelet in the one or more memories; performing, by the computer system, a forward modeling operation using the source wavelet; and generating, by the computer system, the final velocity model using the seismic full waveform inversion with the forward modeling operation.

11 Claims, 14 Drawing Sheets

(56)                References Cited

U.S. PATENT DOCUMENTS

| | | | |
|---|---|---|---|
| 2019/0302293 A1* | 10/2019 | Zhang | G01V 1/282 |
| 2020/0348430 A1 | 11/2020 | Tan et al. | |
| 2021/0063590 A1 | 3/2021 | Cooper et al. | |
| 2021/0311215 A1* | 10/2021 | Liu | E21B 49/00 |
| 2022/0276401 A1* | 9/2022 | Etgen | G01V 1/345 |
| 2023/0184975 A1* | 6/2023 | Zhang | G01V 1/282 |
| | | | 702/14 |

OTHER PUBLICATIONS

Jorge, Nocedal et al., "Numerical Optimization", Springer, 2nd Edition; Year: 2000; pp. 1-664.

Luo Y. et al., "Wave-equation traveltime inversion", Geophysics, vol. 56, No. 5, May 1991; pp. 645-653.

Shen, Xukai et al.; "Full-waveform inversion: The next leap forward in subsalt imaging"; The Leading Edge, vol. 37, No. 1, Jan. 2018; pp. 67b1-67b6.

Tarantona, Albert; "Inversion of seismic reflection data in the acoustic approximation"; Geophysics, vol. 49, Aug. 1984; pp. 1259-1266.

Van Leeuwen, T. et al.; "A correlation-based misfit criterion for wave-equation traveltime tomography"; Geophysical Journal International, vol. 182, No. 3, Year: 2010; pp. 1383-1394.

Virieux, J. et al.; "An overview of full-waveform inversion in exploration geophysics"; Geophysics, vol. 74, No. 6, Dec. 3, 2009; WCC1-WCC26.

Vyas, Madhav et al.; "FWI by utilizing the diversity of local minima" In Second International Meeting for Applied Geoscience & Energy; Society of Exploration Geophysicists and American Association of Petroleum Geologists; image2022-3745677.1; Year: 2022; pp. 732-736.

Zhang, Zhigang et al.; "Correcting for salt misinterpretation with full-waveform inversion"; SEG International Exposition and 88th Annual Meeting, Technical Program; segam2018-2997711.1; Year: 2018; pp. 1143-1147.

Zhang, Zhigang et al.; "FWI Imaging: Full-wavefield imaging through full-waveform inversion"; SEG International Exposition and 90th Annual Meeting; segam2020-3427858.1; Year: 2020; pp. 656-660.

Dong, Shiqi, "The Study of Full Waveform Inversion in Time-domain based on Local-scale Matching of Wavefield", Chinese Doctoral Dissertations Full-text Database, Jun. 1, 2021, pp. 1-156.

* cited by examiner

METHOD AND APPARATUS FOR ADAPTIVE CROSS-CORRELATION BASED FULL WAVEFORM INVERSION

TECHNICAL FIELD

The present disclosure relates to seismic survey methods and apparatus for constructing high resolution geological models by performing an adaptive cross-correlation based full waveform inversion (WI) to enhance characterization of complex subsurface structures in a survey region. The method first automatically evaluates traveltime differences between modeled synthetic data and observed field data through adaptive cross-correlation calculation based on frequency-dependent sliding Hann-window scan and with the aid of a source-independent scheme. The evaluated traveltime differences are inverted to generate a final velocity model to improve images of complex subsurface structures in a survey region.

BACKGROUND OF INVENTION

1. Overview

In oil and gas exploration, seismic data are acquired and processed to generate high-resolution subsurface property volumes such as seismic propagation velocity, anisotropy, absorption, porosity, and reflectivity models. These geophysical properties can be combined to effectively reveal the subsurface structure. Seismic data processing usually includes seismic inversion for building propagation velocity models of long to intermediate wavenumbers and then seismic migration to obtain short wavenumbers seismic reflectivity images. These seismic reflectivity images are used to determine the storage location and size of natural resources, such as hydrocarbons of oil and gas, which informs the exploration/drilling plan. To acquire high-resolution seismic reflectivity images, one needs high multifold acquisition systems designed to obtain sufficient seismic data as well as good seismic velocity models having correct kinematic information before conducting seismic migration.

Existing seismic velocity inversion methods include ray-based seismic tomography and full waveform inversion (FWI) methods. Ray-based tomography methods are efficient and may invert smooth models, which may be sufficient for relatively simple geologic targets, such as shallow sediment environments. However, for complex geologic environments, such as salt domes, sub-basalt targets, overthrust belts, and land foothills, ray-based tomography is not effective and FWI becomes a necessary tool to build velocity model.

FWI directly solves seismic wave equations and matching seismic data, which can produce more accurate seismic propagation velocity models for complex subsurface structures, such as salt-related models. Such propagation velocity models can be used to produce accurate and high-resolution seismic reflectivity images through seismic migration, promote time-lapse monitoring of hydrocarbon reservoirs, and can even directly be transformed to produce high resolution seismic image volumes named as FWI image.

2. Seismic Wave Equations

The seismic waves propagating under the subsurface of the earth are simulated by solving seismic wave equations. Seismic wave equations describe the earth with different physical models, with assumptions that the earth is isotropic or anisotropic, elastic, or acoustic, and attenuated or not. In most FWI developments, the seismic waves were assumed as purely acoustic because the acoustic wave equation is relatively simple and can be solved efficiently. Regardless the assumptions made, all wave equations can be mathematically represented as $$F(m; x)w_s(x, j) = f_s(t), \tag{1}$$

The vector m is the earth model, which refers to a representation of the subsurface properties of the earth, such as the distribution of seismic wave velocities, density, and other physical properties. x is the spatial location, t is time, F(m; x) is the corresponding (forward) modelling operator, and $w_s(x, t)$ is the forward wavefield for a source wavelet $f_s(t)$ excited at a location s.

Numerical solutions of equation (1) have discretization of both spatial variables x and time variable t, such that the solution $w_s(x, t)$ is discretized as $w_s(x_i, t_j)$, where i=1, ..., N is the grid point with N total grid points, and j=1, ..., Nt is the time step with a total of Nt time steps. The commonly used numerical methods are finite difference method, finite element method, and spectral element method. As shown in the disclosure, the method disclosed herein is independent of the form of the wave equation (1) and the numerical method used to solve it.

3. Full Waveform Inversion (FWI)

FWI is a data-driven tool to automatically build the subsurface parameter m, such as velocity and/or density, by iteratively minimizing the difference between recorded data and modeled synthetic data. Given an initial estimate of the subsurface velocity $m_0$, the synthetic data are predicted by solving a forward seismic wave-equation (1) with a source wavelet $f_s(t)$. An adjoint equation of the forward wave equation (1) is solved using the residual between the data and synthetic data as source to get the adjoint wave equation solutions, and a gradient is obtained by cross-correlating the forward and adjoint wave equation solutions, then this gradient is used to update the model along the direction to reduce the misfit between the modeled synthetic data and observed field data. This is repeated in an iterative solution until the data-misfit is sufficiently small.

Mathematically, least-squares (L2) waveform difference based FWI is formulated with the following misfit:

$$\min_m C(m) = \sum_{s=1}^{N_S} \sum_{r=1}^{N_r} \int_0^{t_{max}} dt |d_{obs,s,r}(t) - d_{syn,s,r}(m; t)|^2, \tag{2}$$

where C(m) is a misfit function measuring the waveform differences between the synthetic data and the recorded data, while the modulus operation is denoted by the symbol |·|. Inside the misfit function, $N_s$ is the number of sources, $N_r$ is the number of receivers for a given source, $t_{max}$ is the maximum recording time starting from 0, $d_{obs,s,r}(t)$ is the recorded data at time t for a given source s at the receiver r, $d_{syn,s,r}(m; t)$ is the synthetic data at time t for the same source s and at the same receiver r, obtained by solving the forward seismic wave-equation (1), from which $d_{syn,s,r}(m; t)=P_{s,r}w_s(m; t)$, $P_{s,r}$ resampling the wave solution $w_s(t)$ to the receiver location r. The misfit function (2), called the least-squares or L2 norm misfit function of waveform differences, is the most common misfit function one can see in the oil and gas industry.

4. Traveltime Based FWI

The traveltime based FWI is based on picking the traveltime differences between the modeled synthetic data and the observed field data. The traveltime differences may be obtained by automatically picking the maximum of the cross-correlation between synthetic and recorded data as $$\Delta T(s, r) = \underset{\tau}{\operatorname{argmax}} \int_0^{t_{max}} d_{obs,s,r}(t + \tau) d_{syn,s,r}(t) dt, \tag{3}$$

based on which, traveltime based FWI can be formulated as the least-squares (L2) minimization of traveltime differences as below:

$$\underset{m}{\min} C(m) = \sum_{s=1}^{N_s} \sum_{r=1}^{N_r} \int_0^{t_{max}} dt |\Delta T(s, r)|^2, \tag{4}$$

which is more linear with respect to the difference between an initial velocity model and the true velocity model, as compared to the least-squares cost function of waveform differences in equation (2). It potentially mitigates the cycle-skipping issue without the requirement of at most half wavelength distance between modeled synthetic events and observed real data events.

Furthermore, the amplitudes of the modeled synthetic data are easily inconsistent with that of the recorded data, as seismic forward modeling cannot consider all subsurface physics and may ignore elastic and/or attenuation properties. An acoustic modeling engine is usually used to simulate seismic wave propagation for efficient calculation. Besides, seismic amplitudes are prone to be contaminated during seismic processing. The traveltime (differences) based misfit function downplays the amplitude differences, and therefore diminishes the negative impact of amplitude discrepancies during seismic velocity inversion.

However, the traveltime based FWI is affected by inaccurate and low resolution traveltime (difference) picking. First, traveltime picking might not be correct due to crosstalk noise between multiple seismic events that are not properly matched. Second, traveltime picking resolution could be low because calculation in equation (3) is usually dominated by strong events and relatively weak events are not honored.

Furthermore, the accuracy of source wavelet $f_s(t)$ also can reduce the accuracy of cross-correlation based automatic traveltime picking. It is difficult to have accurate source wavelets, especially for land applications where source wavelets can vary from shot to shot.

Accordingly, new methods are still needed to overcome the deficiencies of conventional traveltime based FWI.

SUMMARY OF THE INVENTION

In one of the embodiments in this disclosure, a method for performing a seismic full waveform inversion to generate a velocity model of subsurface formations of a survey region, including multiple steps, including: positioning seismic data recording sensors in the survey region at different locations and/or positioning a well logging tool including seismic data recording sensors in a well bore in the survey region; emitting at points of incidence in the survey region to generate seismic waves, which travel through subsurface earth formations; observing the seismic waves and recording seismic data based on the seismic waves using the seismic data recording sensors; transmitting the observed seismic data from the seismic data recording sensors to a computer system including one or more memories and storing the observed seismic data in one or more memories, storing a source wavelet and a current medium parameter model in the one or more memories; performing, by the computer system, a forward modeling operation using the source wavelet and a current medium parameter model according to a forward wave equation and obtain a forward wavefield; processing, by the computer system, the synthetic data and the observed seismic data to Hann window operation, respectively, to obtain a localized synthetic data and a localized seismic data; selecting, by the computer system, a traveltime difference based on a cross-correlation between the localized synthetic data and the localized seismic data; solving, by the computer system, an adjoint equation of the forward wave equation is solved using the traveltime difference and the localized seismic data to obtain an adjoint source; generating, by the computer system, an updated medium parameter model for the seismic full waveform inversion and synthetic data using the forward modeling operation; performing operations (e) to (h) until convergence; outputting the updated velocity as the final velocity model to a display upon convergence; and displaying a high-resolution image of the final velocity model on the display of the computer system.

Additional embodiments provide adaptive cross-correlation based FWI methods. In one of the embodiments, the misfit measures traveltime differences automatically picked based on adaptive cross-correlation calculation on local seismic windows. Adaptive cross-correlation indicates that one does not need to make repeated efforts to determine optimal local window size or estimate accurate source wavelets for seismic modeling data. Seismic data are automatically localized by the frequency-dependent sliding Hann window, and possible source wavelet $f_s(t)$ errors in the forward seismic wave-equation (1) are corrected by wiener filters.

Also disclosed is a system for performing a seismic full waveform inversion to generate a velocity model of subsurface formations of a survey region. The system includes a plurality of seismic data recording sensors positioned in the survey region at different locations and/or a well logging tool including seismic data recording sensors positioned in a well bore in the survey region; a blasting device positioned at each point of incidence in the survey region to generate seismic waves, which travel through subsurface earth formations; and a plurality of seismic data recording sensors to sense seismic waves and record seismic data based on the seismic waves. The seismic data recording sensors transmit the seismic data to a computer system including one or more memories and at least one processor, the one or memories store the transmitted seismic data, a source wavelet, and instructions, and the one or more processors execute the instructions stored in the one or more memories to implement one of the method disclosed in this disclosure.

Although the embodiments herewith disclosed, described a FWI algorithm with a traveltime (difference) misfit function, utilizing finite-difference numerical solution of the scalar acoustic wave equation for seismic propagation. It would be apparent to a person having ordinary skills in the art that it can also be alternatively applied to vector wave equations and elastic equations, in both isotropic and anisotropic media, without departing from the true scope of the invention, as defined in the claims set forth below.

BRIEF DESCRIPTION OF THE DRAWINGS

The teachings of the present invention can be readily understood by considering the following detailed description in conjunction with the accompanying drawings.

Figure 1:
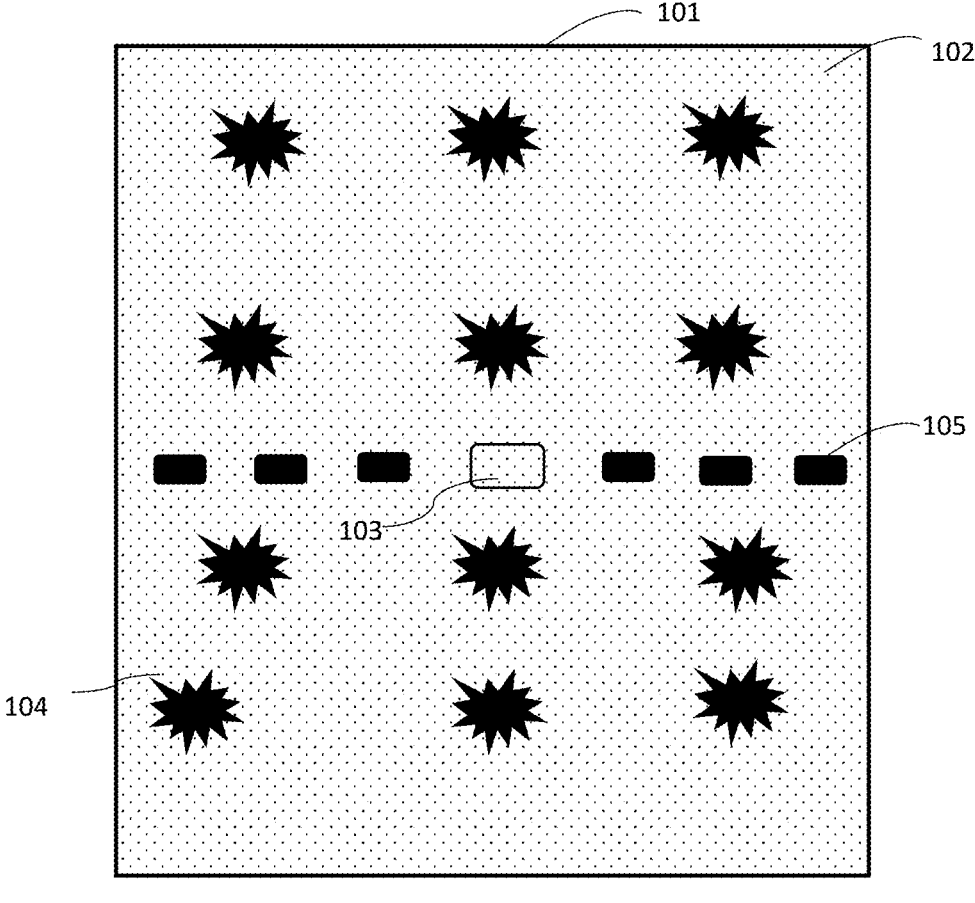
FIG. 1 is a is a schematic diagram illustrating a top view of a survey region with the various points of incidence of seismic sources according to an embodiment in this disclosure.

| | |
|---|---|
| m | Earth model, including seismic velocity model and density model |
| $d_{syn}$ | Synthetic data (modeled with inverted earth model) |
| $d_{obs}$ | Recorded/observed real data |
| g | FWI gradient |
| a | Step length |
| Subscript i | Iteration number (say the i-th iteration) |
| Subscript s | The seismic shot/source number |
| Subscript r | The seismic receiver number |
| Subscript k | The local window number a long the time axis t. |
| $f_s$ | Source function/signature at the shot/source number of s. |
| $w_s$ | Forward seismic wavefields |
| $u_s$ | Backward adjoint wavefields with adjoint sources $d_{obj}$ |
| F | Forward modeling operator |
| C | Misfit/objective function |
| $\Delta T$ | Picked traveltime difference between real data and synthetic data |
| $t_w$ | Local window size (time length) |
| $t_k$ | Starting time of a local window |
| $t_{max}$ | Maximum recording time starting from 0 |
| $F^{\dagger}$ | Conjugate of F, means backward propagate the adjoint wavefields |
| Superscript† | Means conjugate operation |

DETAILED DESCRIPTION OF THE INVENTION

Reference will now be made in detail to several embodiments of the present disclosures, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures, systems, and methods illustrated herein may be employed without departing from the principles of the disclosure described herein.

Throughout the specification, the terms approach(es) and method(s) are used interchangeably and have the same meaning. The following table provides definitions of symbols in equations throughout the specification.

The present disclosure relates to building high resolution geological models by performing an improved seismic full waveform inversion to improve images of complex subsurface structures (formations) in a survey region by applying methods, apparatuses, and mediums including one or more source-independent misfit functions.

FIGS. 1-4 show exemplary embodiments of methods, apparatuses, and mediums for obtaining and storing the seismic data, which is processed to generate the one or more high resolution geological models for high resolution images for lithology identification, fluid discrimination, and reservoir characterization of complex subsurface structures of a survey region. The survey region may be subsurface structures under land or subsurface structures under the sea.

FIGS. 5-17 show exemplary embodiments of apparatuses, methods, and mediums to provide an improvement in the quality of seismic full waveform inversion results by using an improved seismic full waveform inversion technology to improve lithology identification, fluid discrimination, and reservoir characterization in the field of seismic exploration including the use of a computer-implemented seismic full waveform inversion approach. FIGS. 5-17 show exemplary embodiments of apparatuses, methods, and mediums for generating one or more high resolution geological models for high resolution images for lithology identification, fluid discrimination, and reservoir characterization of complex subsurface structures of a survey region. FIGS. 5-17 show exemplary embodiments that generate inverted model parameters, which utilize frequency-dependent sliding Hann window and are independent of source wavelet, and which are used to perform seismic full waveform inversion to generate high resolution geological models for high resolution images of a survey region including complex subsurface structures. FIGS. 5-17 show exemplary embodiments that utilize frequency-dependent sliding Hann window and are independent of the form of a source wavelet to generate one or more high resolution geological models for high resolution imaging for lithology identification, fluid discrimination, and reservoir characterization of complex subsurface structures of a survey region.

FIG. 1 is a schematic diagram illustrating a top view of a survey region with the various points of incidence of seismic sources according to an embodiment. More specifically, FIG. 1 illustrates a seismic survey region (survey region) 101, which is a land-based region denoted by reference numeral 102. Reference number 102 denotes the top earth formation of the land-based region 102. Persons of ordinary skill in the art, will recognize that seismic survey regions produce detailed images of local geology to determine the location and size of possible hydrocarbon (oil and gas) reservoirs, and therefore a well location 103. In these survey regions, seismic waves bounce off underground rock formations during emissions from one or more seismic sources at various points of incidence 104. A blast is an example of a seismic source generated by seismic equipment. The seismic waves that reflect back to the surface are captured by seismic data recording sensors 105, transmitted by one or more data transmission systems (frequently wirelessly) from the seismic data recording sensors 105, and stored for later processing and analysis by a high-performance computing system. Although this example shows a top earth formation of a land-based region 102, it is understood that this is only an example, and the methods and system may also be applied to a survey region at the bottom of an ocean.

Figure 2:
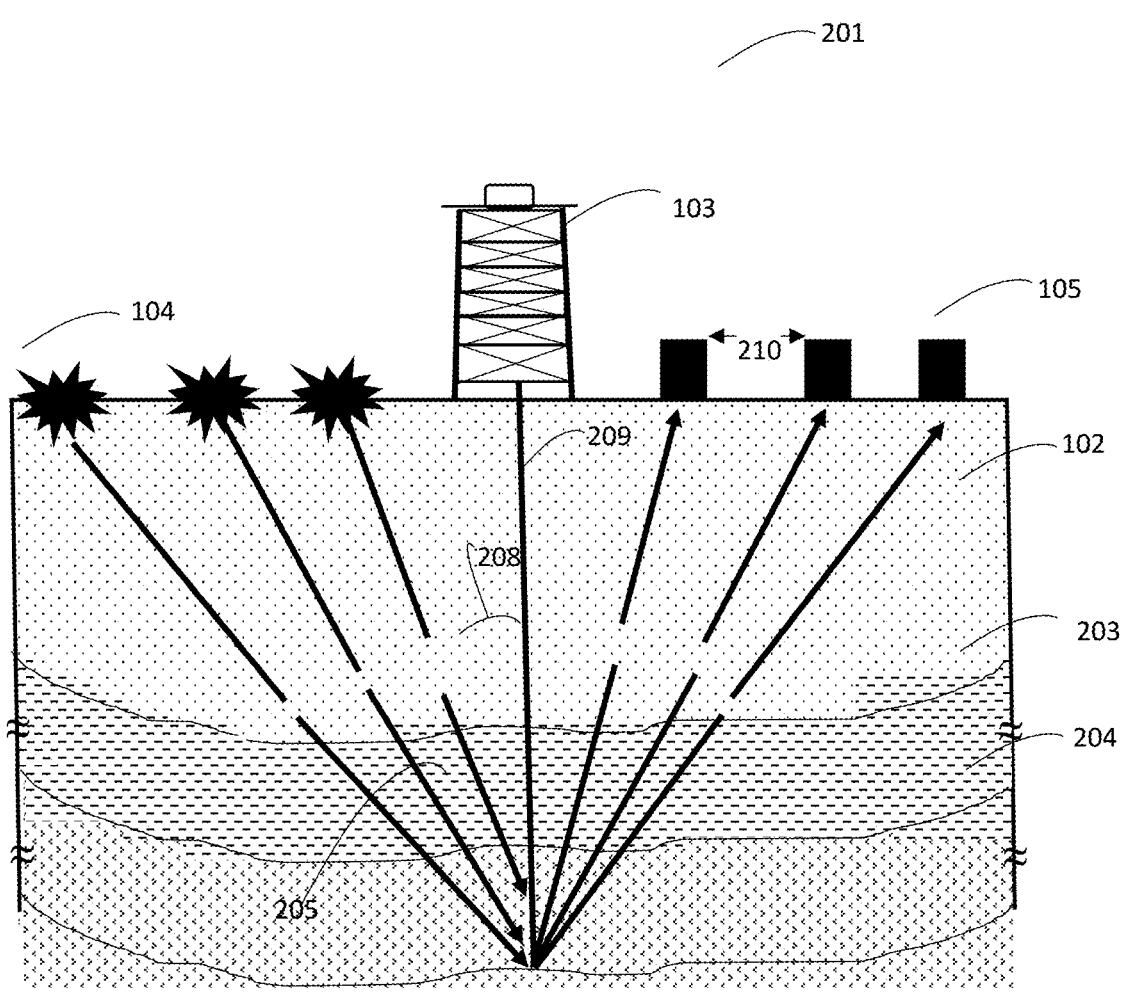
FIG. 2 is a schematic diagram illustrating a cross-sectional view of an environment with points of incidence of seismic sources, seismic data recording sensors, a well location, a wellbore, the various transmission rays, and the various angles of incidence, according to an embodiment.

FIG. 2 is a schematic diagram illustrating a cross-sectional view of a seismic survey region 101 in FIG. 1 with points of incidence of seismic sources, seismic data recording sensors (seismic receivers), a well location, a wellbore, the various transmission rays, and the various angles of incidence, according to an embodiment. More specifically, in FIG. 2 a cross-sectional view of a portion of the earth over the seismic survey region is denoted by reference numeral 201, showing different types of earth formations denoted by reference numerals 102, 203, and 204. Although the seismic survey region is based on land in this example, it is understood that this is only an example and that the methods and system may also be applied to a survey region at the bottom of an ocean. FIG. 2 illustrates a common midpoint-style gather, where seismic data are sorted by surface geometry to approximate a single reflection point in the earth. The survey seismic data may also be referred to as traces, gathers, or image gathers. In this example in FIG. 2, data from one or more shots or blasts and receivers may be combined into a single image gather or used individually depending upon the type of analysis to be performed.

As shown on FIG. 2, one or more shots or blasts represents seismic sources located at various points of incidence or stations denoted by reference numeral 104 at the surface of the Earth at which one or more seismic sources are activated. Seismic energy or seismic sources from multiple points of incidence 104, will be reflected from the interface between the different earth formations. These reflections will be captured by multiple seismic data recording sensors 105, each of which will be placed at different location offsets 210 from each other, and the well 103. Because all points of incidences 104, and all seismic data recording sensors 105 are placed at different offsets 210, the survey seismic data or traces, also known in the art as gathers or image gathers, will be recorded at various angles of incidence represented by 208. The points of incidence 104 generate downward transmission rays 205, in the earth that are captured by their upward transmission reflection through the seismic data recording sensors 105. Well location 103, in this example, is illustrated with an existing drilled well attached to a wellbore, 209, along which multiple measurements are obtained using techniques known in the art. This wellbore 209, is used to obtain well log data, which may include P-wave velocity, S-wave velocity, Density, among others. Other sensors, not depicted in FIG. 2, may be placed within the survey region to capture seismic data. Seismic data may be used to examine the dependence of amplitude, signal-to-noise, move-out, frequency content, phase, and other seismic attributes, on incidence angles 208, offset measurements 210, azimuth, and other geometric attributes that are important for data processing and imaging of a seismic survey region.

Figure 3:
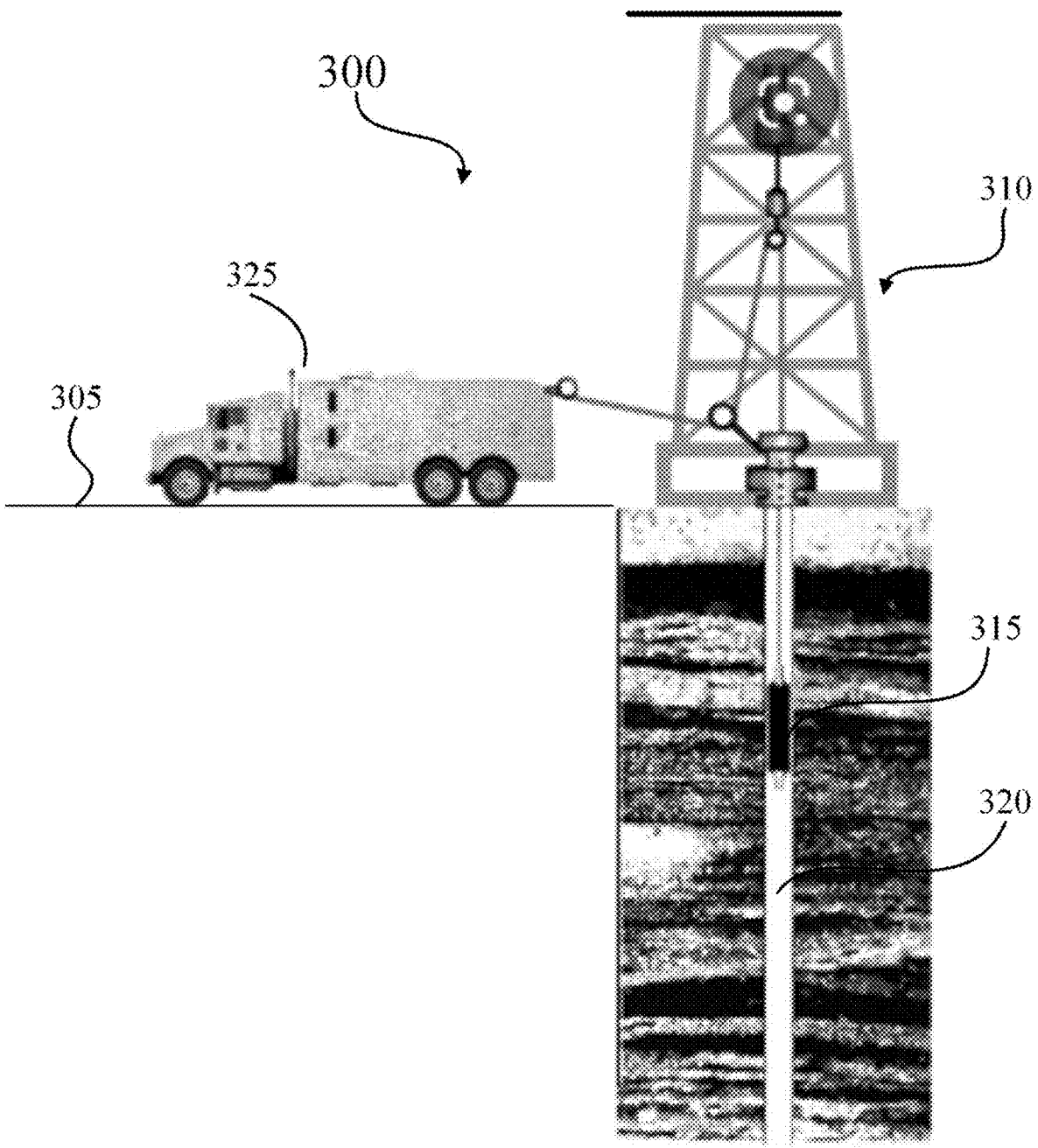
FIG. 3 is a schematic diagram illustrating a cross-sectional view of an environment with a wellbore and a well logging tool including one or more sonic generators and one or more well log data recording sensors according to an embodiment.

FIG. 3 is schematic diagram illustrating a cross-sectional view of a seismic survey region with a wellbore and well logging tool including one or more sonic generator and one or more well log data recording sensors according to an embodiment. A sonic generator is an example of equipment to produce one or more sonic waves (sound waves). A sonic generator may be referred to as a sonic source because the sonic generator produces or generates one or more sonic waves (sound waves) which are also referred to as seismic waves. The one or more well log data recording sensors are examples of one or more seismic data recording sensors (seismic receivers or seismic data recorders) and may be the same seismic data recording sensors as seismic data recording sensors 105. In embodiments of the present invention, oil and/or gas production is discontinued in order to generate seismic waves and record seismic data including reflections of the seismic waves moving through the subsurface of one or more earth formations in the seismic survey region.

FIG. 3 shows an oil drilling system 300 on land 305 including a drilling rig 310. The drilling rig 310 supports the lowering of a well logging tool 315 into a wellbore 320. The well logging tool 315 may include one or more sonic generators (sonic sources) to generate one or more sound waves, which are transmitted into one or more earth formations to generate reflections or reflection waves in the one or more earth formations. Although this example shows one or more earth formations of a land-based survey region, it is understood that this is only an example and that the methods and systems may also be applied to a survey region at the surface or bottom of a body of water such as an ocean. The well logging tool 315 also includes one or more well log data recording sensors. As discussed above, the one or more well log data recording sensors receive and record well log data, which includes reflection data received by the one or more well log data recording sensors in response to the sound waves transmitted into one or more earth formations by the one or more sonic generators. The well log data is an example of seismic data. The well log data may include compression wave velocity or P-wave velocity (Vp), shear wave velocity (Vs), and density, which is an indicator of porosity. This well logging process to record well log data may also be referred to as sonic logging. A vehicle 325 may be coupled to the well logging tool 315 to assist in the lowering and raising of the well logging tool 315 as well as communicating with the well logging tool 315 to obtain well log data. Alternatively, in methods and systems for a survey region at the surface or bottom of a body of water such as an ocean, another device or system may use to assist in the lowering or raising of the well logging tool 315 as well as communicating with the well logging tool 315 to obtain well log data.

Figure 4:
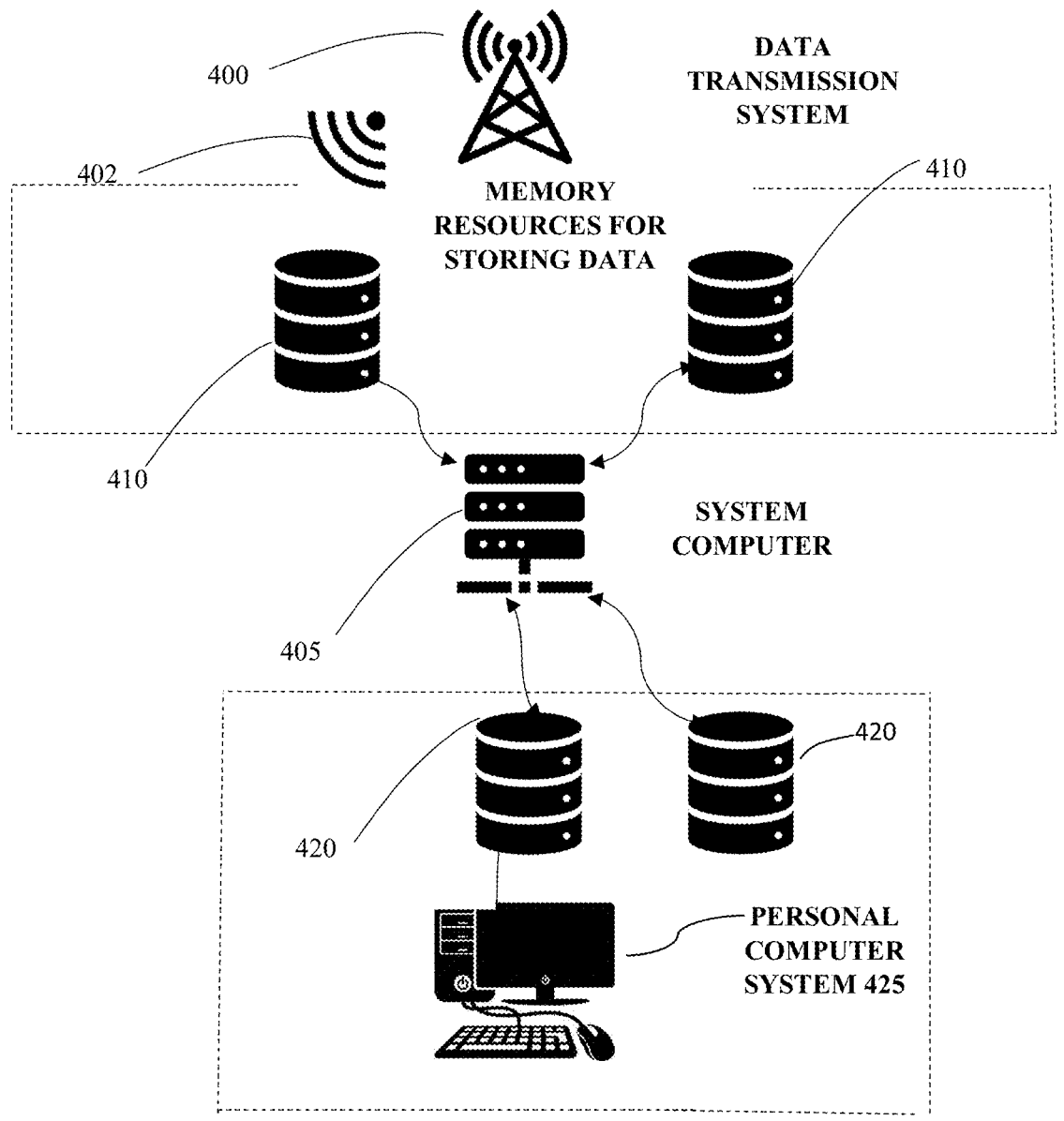
FIG. 4 is a schematic diagram illustrating a high-performance computing system according to an embodiment.

FIG. 4 is a schematic diagram illustrating a high-performance computer system according to an embodiment, which receives (frequently wirelessly) seismic data regarding seismic waves from the seismic data recording sensors 105 in FIGS. 1 and 2 and/or the seismic data recording sensors in FIG. 3, which are also referred to as well log data recording sensors in FIG. 3. The high-performance computer system in FIG. 4 stores the seismic data in at least one memory for later processing and analysis by computer implemented methods and apparatuses of one or more embodiments. The analyzed or processed seismic data may be accessed by a personal computer system. More specifically, FIG. 4 shows a data transmission system 400 for wirelessly transmitting seismic data from seismic data recording sensors to a system computer 405 coupled to one or more storage devices 410 to store the seismic data in databases. The data transmission system may also transmit wirelessly seismic data from seismic data recording sensors 105 directly to one or more storage devices 410 to store the seismic data in databases, which may be accessed by system computer 405. The wireless transmission is denoted by reference numeral 402. The one or more storage devices 410 may also store other computer software instructions or programs to implement apparatuses and methods described in embodiments. The system computer 405 may be coupled (e.g., wirelessly coupled) to one or more output storage devices 420, which may receive the results of computer implemented processes or methods performed by the system computer 405. A personal computer 425 may be coupled (e.g., wirelessly coupled) to one or more output storage devices 420 and/or to the computer system 405 so that a user may utilize a user interface of the personal computer 425 to input information or obtain the results of the computer implemented processor methods performed by the system computer 405. The one or more storage devices 420 may also store other computer software instructions or programs to implement apparatuses and methods described in embodiments.

A user interface of the personal computer 425 may include, for example, one or more of a keyboard, a mouse, a joystick, a button, a switch, an electronic pen or stylus, a gesture recognition sensor (e.g., to recognize gestures of a user including movements of a body part), an input seismic device or voice recognition sensor (e.g., a microphone to receive a voice command), an output seismic device (e.g., a speaker), a track ball, a remote controller, a portable (e.g., a cellular or smart) phone, a tablet PC, a pedal or footswitch, a virtual-reality device, and so on. The user interface may further include a haptic device to provide haptic feedback to a user. The user interface may also include a touchscreen, for example. In addition, a personal computer 425 may be a desktop, a laptop, a tablet, a mobile phone or any other personal computing system.

Processes, functions, methods, and/or computer software instructions or programs in apparatuses and methods described in embodiments herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The one or more databases may include a collection of data and supporting data structures which may be stored, for example, in the one or more storage devices 410 and 420. For example, the one or more storage devices 410 and 420 may be embodied in one or more non-transitory computer readable storage media, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage devices 410 and 420 are not limited to the above description, and the storage may be realized by other various devices and structures as would be understood by those skilled in the art.

Figure 5:
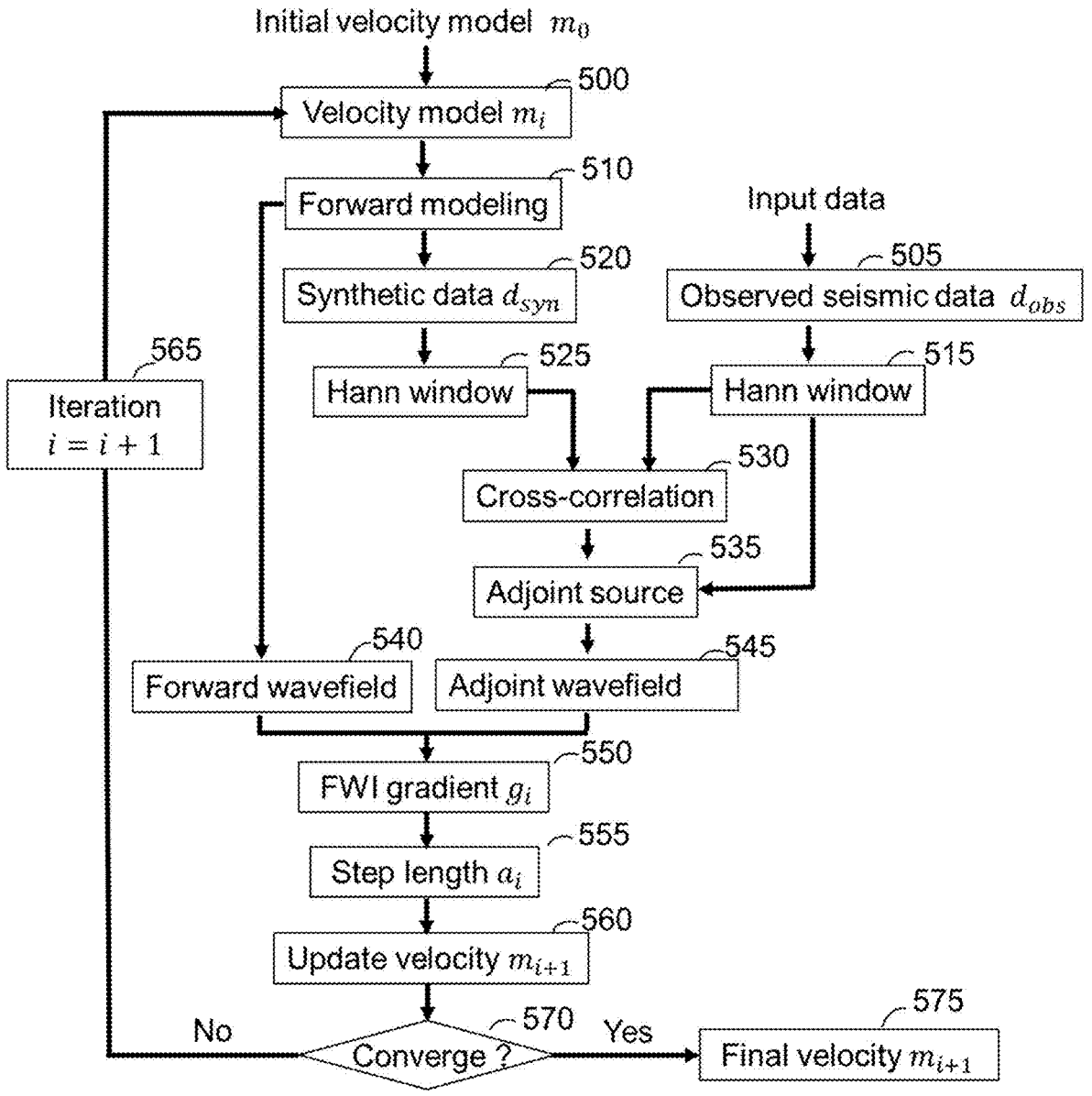
FIG. 5 is a flow diagram illustrating a FWI process using local Hann-window based cross-correlation FWI according to the current disclosure.

FIG. 5 is a flowchart illustrating a seismic full waveform inversion method employing Hann window according to an embodiment in this disclosure. The survey region may be subsurface structures under land or subsurface structures under the sea.

Referring to the seismic full waveform inversion method of FIG. 5, input data (observed seismic data or dobs) is stored and/or processed on a computing device in operation 505. For example, the seismic data recording sensors 105 in FIGS. 1 and 2 and/or the well log data recording sensors of the well logging tool 315 in FIG. 3 may detect the seismic data and transmit the seismic data to the high-performance computing system shown in FIG. 4. As discussed above in FIGS. 1-4, the seismic data detected in the survey region may be stored in one or more memories such as one or more storage devices 410 and one or more output storage devices 420.

Further, an initial earth model m0 may be input into the seismic full waveform inversion method as shown in FIG. 5. The initial earth model m0 may be a P-wave velocity model.

It is understood that an initial velocity model may be a group of parameters. This initial velocity model m0 may be a predetermined velocity model based on established scientific norms. This initial velocity model m0 may be input by a user through a user interface such as the user interface of the personal computer 425 or may be stored in one or more memories such as one or more storage devices 410 and one or more output storage devices 420.

As shown in the seismic full waveform inversion method of FIG. 5, there is an initial model such as initial velocity model m0, which is input into a loop. In operation 500, the current velocity model mi is determined. Initially, velocity model mi is the initial velocity model m0. The variable i denotes an iteration number for the loop. Accordingly, i=0 initially. In each iteration in FIG. 5, velocity model mi is updated in operation 500. For example, after the first iteration, the velocity model will be m1, where i=1. After the second iteration, the velocity model will be m2, wherein i=2. Iterations will continue until a convergence is detected in operation 570. After convergence is detected in operation 570, the final velocity model mi+1 denoted by reference numeral is outputted by operation 575, which corresponds to the most recent velocity in operation 510 is output to a storage device or a display.

Referring to operation 510 in the seismic full waveform inversion method of FIG. 5, the velocity model mi is input into operation 510 for forward modeling. Forward modelling of seismic data is a technique that creates (generates) synthetic seismic data from geological information, which in this case is the velocity model mi. The forward modeling operation requires a source wavelet, which may be a known source wavelet function that differs from the true source signature of the seismic survey being conducted or analyzed. Examples of the source wavelet functions include the Ormsby wavelet, the Ricker wavelet, etc. The source wavelet is used in the forward modeling operation to generate synthetic data $d_{syn}$ based on the velocity model mi. Synthetic data $d_{syn}$ is denoted by reference numeral 520 and represents synthetic data output by the forward modeling operation 510.

Figure 7:
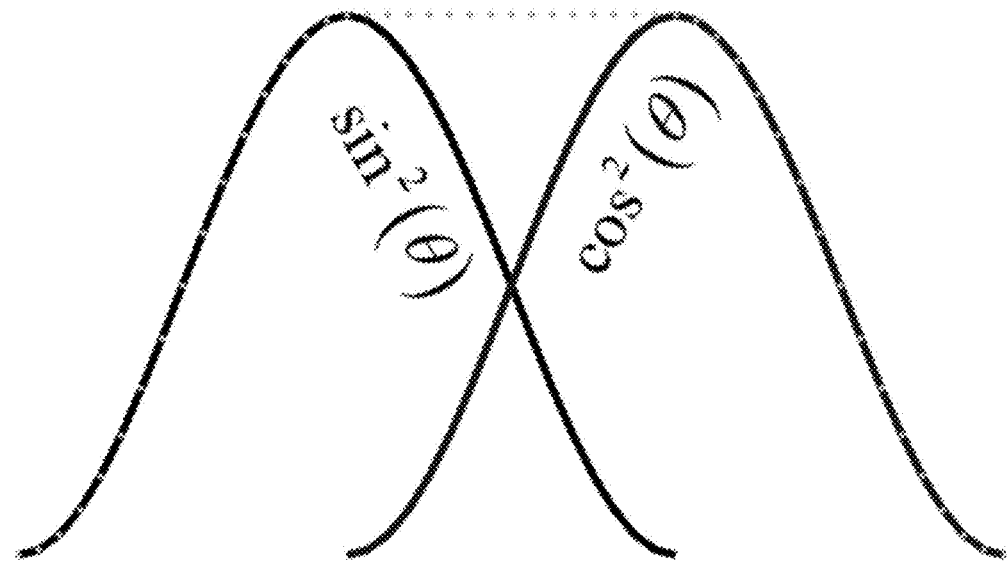
FIG. 7 depicts a sliding Hann window, whose size and sliding stride are automatically determined based on data frequency of localizing seismic data.

In FIG. 5, the synthetic data dsyn is input into the Hann windowing operation 525, while the real data dobs is subject to Hann-windowing in 515. Hann or Hann function is a window function to separate a complete/long signal into a series of local/short signals along recording time. FIG. 7 depicts a sliding Hann window, whose size and sliding stride are automatically determined based on data frequency for automatically localizing seismic data. The sliding Hann window can efficiently transform data into local domain without energy loss.

In operation 515, equation (5) represents k-th localized data $d_{obs,s,r}(t)$ processed using the Hann function $W_k(t)$:

$$d_{obs,s,r,k}(t) = W_k(t)d_{obs,s,r}(t), \tag{5}$$

while equation (6) represents the summation of localized data:

$$d_{obs,s,r}(t) = \sum_k d_{obs,s,r,k}(t). \tag{6}$$

12

Note that the summation of localized data equals the original data. Thus, the data localization procedure employing Hann-windowing does not cause energy loss.

Equation (5) can be expanded as $$\begin{cases} d_{obs,s,r,k}(t) = \sin^2\left(\frac{2\pi(t-t_k)}{t_w}\right)d_{obs,s,r}(t), \\ 0 \le t - t_k \le t_w, \\ t_k = t_k + T(f), \\ t_w = 2T(f). \end{cases} \tag{7}$$

which is frequency dependent. T(f) represents one time wavelength at frequency of f; the local window stride $t_k$ is one wavelength; and local window size $t_w$ is two wavelengths.

The same Hann-windowing process is also applied to synthetic data in operation 525 and produces localized synthetic data $d_{syn,s,r,k}(t)$. Thus, the total window number per seismic trace Nk is calculated as $$Nk = \frac{t_{max} + T(f)}{2T(f)}, \tag{8}$$

$t_{max}$ is the maximum recording time starting from 0. The window number increases with increasing central frequency.

In operation 530, the time-shift for the k-th local data set may be obtained by automatically picking the maximum of the cross-correlation between synthetic and observed data as:

$$\Delta T(s, r, k) = \underset{\tau}{\mathrm{argmax}} \int_{t_k}^{t_k+t_w} d_{obs,s,r,k}(t+\tau)d_{syn,s,r,k}(t)dt, \tag{9}$$

which captures non-stationary variations of traveltime differences for different seismic events.

The ΔT(s, r, k) from operation 530 and localized observed data $d_{obs,s,r}(t)$ from the Hann-windowing operation 515 to obtain the adjoint source in operation 535 as in the following:

$$d_{adj,s,r}(t) = \sum_{k=1}^{N_k} \Delta T(s, r, k) \times \frac{\partial d_{obs,s,r,k}(t+\Delta T(s,r,k))}{\partial t}W_k(t). \tag{10}$$

Referring to the calculation of the FWI gradient gi in operation 550, operation 550 reversely propagates the one or more adjoint sources generated by equation (10) to obtain an adjoint wavefield, which has the following formula:

$$F^\dagger(m; x)u_s(x, t) = d_{adj,s}(t), \tag{11}$$

where $F^\dagger(m; x)$ is the adjoint operator of forward model operator F(m; x); $d_{adj,s}(t)$ is the adjoint source; and $u_s(x, t)$ is the adjoint wavefield.

Using the forward wavefield 540 and the adjoint wavefield above, one obtains a gradient for each iteration using the following formula:

$$g_i(x) = \sum_{s=1}^{N_s} \int_0^T dt \left( \frac{\partial F(m; x)}{\partial m} w_s(x, t) \right)^T u_s(x, t), \tag{12}$$

where F(m, x) wave-equation forward operator; ws(x,t) is forward wavefield; us(x,t) is backward adjoint wavefield from equation (11). The gradients in equation (11) from different shots (blasts or sonic generators) are summed and stacked to get a single gradient in operation 550.

Operation 555 determines (1) the magnitude of increase of the estimated velocity toward the true velocity model or the magnitude of the decrease of the estimated velocity model and (2) whether the estimate of the velocity model should increase to improve the approximation of the true velocity model or the estimate of the velocity model should decrease to improve the approximation of the true velocity model.

More specifically, once a gradient is calculated and output by operation 550, a step length ai and a search direction Pi are calculated in operation 555 using optimization methods. For example, starting an initial guess of the subsurface parameters $m_{i=0}$, the model at iteration i+1 is updated as $$m_{i+1} = m_k + a_i P_i, i = 0, 1, \ldots, \tag{13}$$

where $P_i$ is called the search direction and $a_i$ is a step length. The simplest inversion method is called the steepest-descent algorithm, in which the search direction $P_i$ is simply given by the negative gradient of the objective at iteration k:

$$P_i = -g_i, \tag{!4}$$

such that equation (13) becomes $$m_{i+1} = m_i - a_i g_i \tag{15}$$

Then, the step length is determined in a way to minimize the cost function.

The operation 555 receives the gradient and determines the both the search direction Pi, accounting for (increase or decrease) of the estimated velocity model and the step length ai, accounting for the magnitude of increase or decrease of the estimated velocity toward the true velocity model. Accordingly, operation 555 scales the output of FWI gradient gi operation 550, so that an optimum magnitude of the directional increase of the estimated velocity model is provided to avoid excessively large increases/decreases in the estimated velocity model (which would substantially increase the number of iterations) or excessively small increases/decreases in the estimated velocity model (which would substantially increase the number of iterations). Thereafter, the velocity model mi+1 is updated in operation 560 based on the equation (15).

Referring to the convergence operation 570, the seismic full waveform inversion method determines whether an additional iteration denoted is required. If an additional iteration is required, then the numerical value of i is increased in operation 565 and the update velocity model mi+1 becomes the velocity model mi in operation 500.

In an embodiment, operation 565 may set a maximum number of iterations. A maximum number of iterations may be in the range of 10 to 40. Once the number of iterations represented by i equals a predetermined maximum number of iterations, then the seismic full waveform inversion method of FIG. 5 is considered to have converged and the final velocity model mF, which is the same as the last updated velocity model mi+1 determined in operation 575, is output.

In a further embodiment, operation 575 may also set an additional threshold based on the difference between the current update velocity output in operation 575 and the immediately preceding velocity output in operation 575. If the difference is greater than (or greater than or equal to) a threshold, then the next iteration 575 may proceed provided that the maximum number of iterations has not been exceeded. However, if the different is less than (or lass than or equal to) a threshold, then the seismic full waveform inversion method of FIG. 5 is considered to have converged. An image of final velocity model mF may be displayed, for example, on the personal computer system 425.

Figure 6:
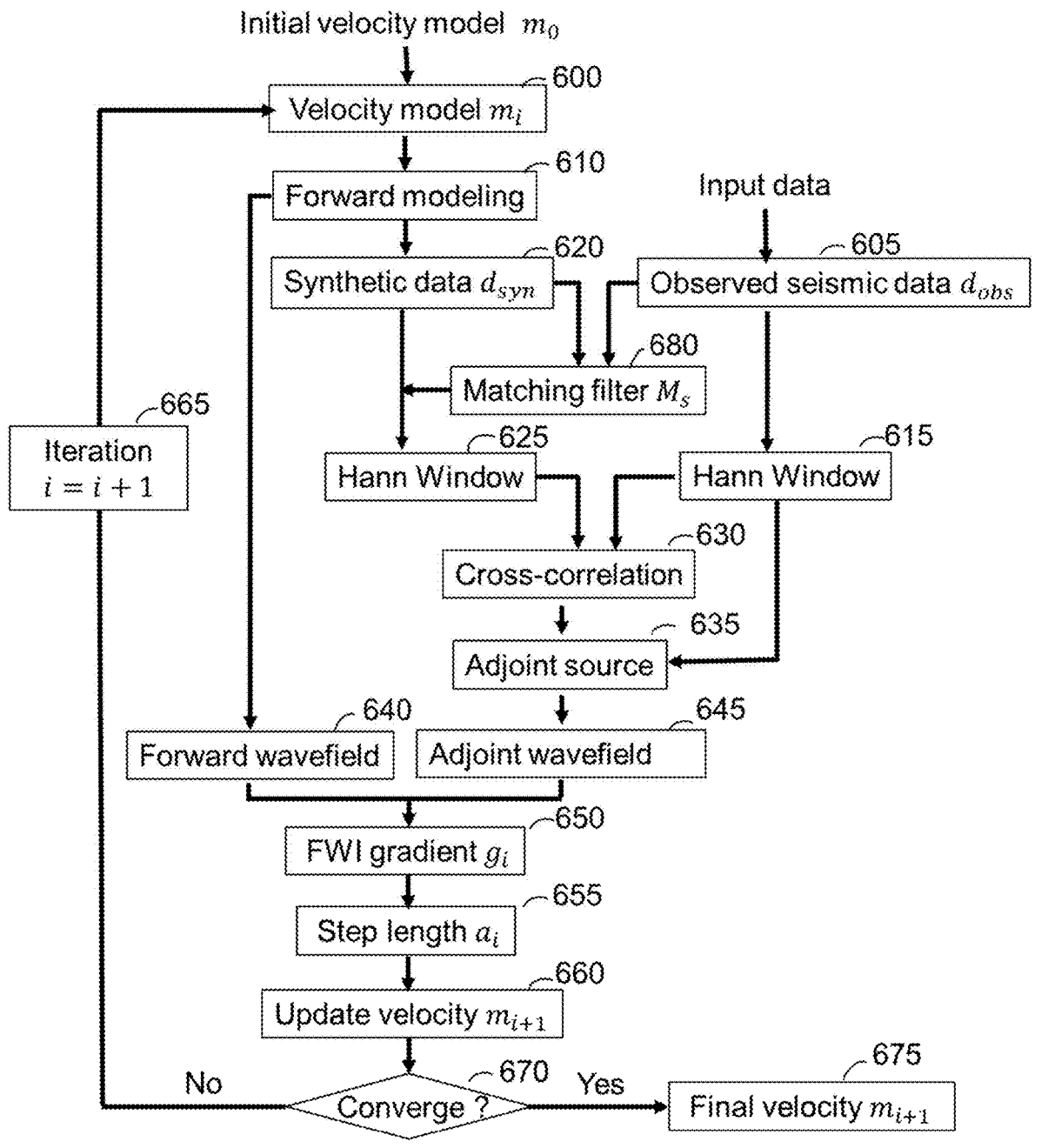
FIG. 6 is a flow diagram illustrating a FWI process using local Hann-window and source independent cross-correlation FWI.

FIG. 6 is a workflow of another embodiment in this disclosure, which depicts a FWI method that is source wavelet independent and employs a matching filter to correct synthetic data before cross-correlation calculation and traveltime picking. Operations 600, 605, 610, 615, and 620 in FIG. 6 correspond to and performs the same functions as operations 500, 505, 510, 515, and 520 in FIG. 5, respectively. Nevertheless, differing from the method shown in FIG. 5, operation 680 obtains a matching filter $M_s(t)$, which can be mathematically expressed in equation (17):

$$M_s(t) = \text{Inverse Fourier Transform} \left[ \frac{\sum_{r=1}^{N_r} d^\dagger_{syn,s,r}(\omega) d_{obs,s,r}(\omega)}{\sum_{r=1}^{N_r} d^\dagger_{syn,s}(\omega) d_{syn,s}(\omega) + \epsilon} \right], \tag{16}$$

where $d_{obs,s,r}(\omega)$ and $d_{syn,s,r}(\omega)$ are Fourier transform of the time domain observed and synthetic data, respectively.

Referring to the matching filter shown in equation (16), the matching filter $M_s(t)$ matches observed seismic data dobs detected in the survey region in operation 605 and synthetic data dsyn in operation 620. The observed seismic data dobs may be data recorded by sensors such as the seismic data recording sensors 105 in the survey region and the well log data recording sensors positioned in the wellbore of the survey region by the well logging tool 315.

An example of a matching filter $M_s(t)$ may be a Wiener filter. The matching filter matches the phase and amplitude of the synthetic data with the phase and amplitude of the seismic data. The matching filter is determined in each iteration operation 665 using the calculated synthetic data, so that the velocity model mi may ultimately be updated. Convolving the matching filter with synthetic data dsyn produces a matched synthetic data that has a source signature as that of the observed seismic data detected in the survey region.

As discussed above, errors in this source wavelet may lead to errors of traveltime difference picking and thus the inverted model errors. Therefore, a reasonable source wavelet estimation is still important for success of cross-correlation based FWI. A typical procedure of such an estimation is to window the first arrival event in the data and stack this event to serve as the source wavelet. This estimate source wavelet does not change during the iterative process. However, an accurate estimation of the source wavelet in industrial field application is difficult to achieve because of the poor repeatability of the source signature from shot to shot (blast to blast or sonic source to sonic source), the coupling uncertainty of the source and the earth, as well as the coupling of the receivers and the earth. Therefore, a great effort has been spent on the source-independent misfit function methodologies to overcome such problems. The matching filter operation 680 combined with other operations such as adjoint source obtained in operation 635 in FIG. 6 solve these problems.

Synthetic data from operation 620 first convolves with the matching filter $M_s(t)$ obtained in operation 680. The convolved synthetic data $M_s(t)*d_{syn,s,r,k}(t)$ (* denoting a convolution operator), which is more similar to the observed data, is then localized with Hann window in operation 625 to obtain $d_{syn,s,r,k}(t)$.

In operation 630, the automatic traveltime difference picking in local windows is then defined as:

$$\Delta T(s, r, k) = \underset{\tau}{\mathrm{argmax}} \int_{t_k}^{t_k+t_w} d_{obs,s,r,k}(t + \tau)(M_s(t)*d_{syn,s,r,k}(t))dt, \quad (17)$$

in which the shot-independent matching filter $M_s(t)$ is calculated by matching the synthetic data to the observed seismic data.

Accordingly, the traveltime based misfit function is defined as $$\underset{m}{\min} C(m) = \sum_{s=1}^{N_s}\sum_{r=1}^{N_r}\sum_{k=1}^{N_k}\Delta T^2(s, r, k). \quad (18)$$

In operation 635, the adjoint source can be derived with the chain rule as $$d_{adj,s,r}(t) = M_s(t) \otimes \sum_{k=1}^{N_k}\Delta T(s, r, k) \times \frac{\partial d_{obs,s,r,k}(t + \Delta T(s, r, k))}{\partial t}W_k(t), \quad (19)$$

where $\otimes$ denotes the cross-correlation operator. The Wiener matching filter $M_s(t)$ is determined shot-by-shot in each iteration to correct the phase of adjoint sources. The final adjoint sources are weighting stack results of local window ones.

Operations 640, 645, 650, 655, 660, 665, 670, and 675 in FIG. 6 correspond to and are substantially similar to operations 540, 545, 550, 555, 560, 565, 570, and 575 in FIG. 5.

Therefore, in the method shown in FIG. 6, the gradient of this cost function can then be constructed with the adjoint sources from operations 635. For example, using the forward and adjoint wavefields, one obtains a FWI gradient gi in operation 650 by solving the adjoint wave equation (11), which is then used to minimize the misfit function equation (18) by updating the velocity model m using any inversion method, such as steepest-descent algorithm. There are also other more advanced inversions, such as the nonlinear conjugate gradient method, Gaussian Newton's method, and a quasi-Newton's method called L-BFGS. Operations 550 and 650 are substantially similar.

Nevertheless, comparing the adjoint source obtained in operation 635 according to equation (19) with the adjoint source obtained in operation 535 according to equation (10), it is clear that there is an extra cross-correlation operation with $M_s(t)$ in equation (19) in operation 635.

Therefore, the cross-correlation based FWI method becomes independent of the source wavelet. The matching filter operation 680 and the adjoint source operation 635 remove the need of an updated source wavelet in forward modeling operation 610.

This approach generates the inverted model parameters that are independent of the choice of this wavelet. This source wavelet independence reduces model inversion errors due to source wavelet errors and reduces the human efforts to estimate source wavelets shot by shot. It makes the cross-correlation based FWI very robust to build high resolution geological models to improve images of complex subsurface structures in a survey region to improve lithology identification, fluid discrimination, and reservoir characterization in the field of seismic explorations.

The adaptive cross-correlation based FWI according to FIG. 5 or FIG. 6 can robustly invert medium parameters. According to one embodiment, each iteration involves a series of steps, e.g., step 1: forward modelling using wave equation (1) with a theoretical wavelet such as an Ormsby wavelet and the medium parameter models mi at the current i-th iteration, with which the forward wavefield $w_s(m_i; x, t)$ in the subsurface is obtained and the synthetic data recorded at receiver locations $d_{syn,s,r}(m_i; t)$ is estimated; step 2: determining the matching filter, e.g., a Wiener filter, using equation (16); step 3: automatically picking traveltime using equation 10 with automatically determined local windows with the proposed sliding Hann window as described in equation (17); Step 4: calculating the adjoint source using equation (19); Step 5: reversely propagating the adjoint sources using the same model to obtain the adjoint wavefield $u_s(m_i; x, t)$; Step 6: calculating the gradient $g_i(x)$ using the obtained forward wavefields $w_s(m_i; x, t)$ and the adjoint wavefield $u_s(m_i; x, t)$; Step 7: Using the selected optimization method to obtain the search direction $p_i(x)$; Step 8: using the linear perturbation theory to calculate the step length $a_i$; Step 9: updating the medium parameter model with the step length. Repeat steps 1 to 9 until the misfit function, i.e., equation (18) is minimized to a predetermined value.

Figure 8:
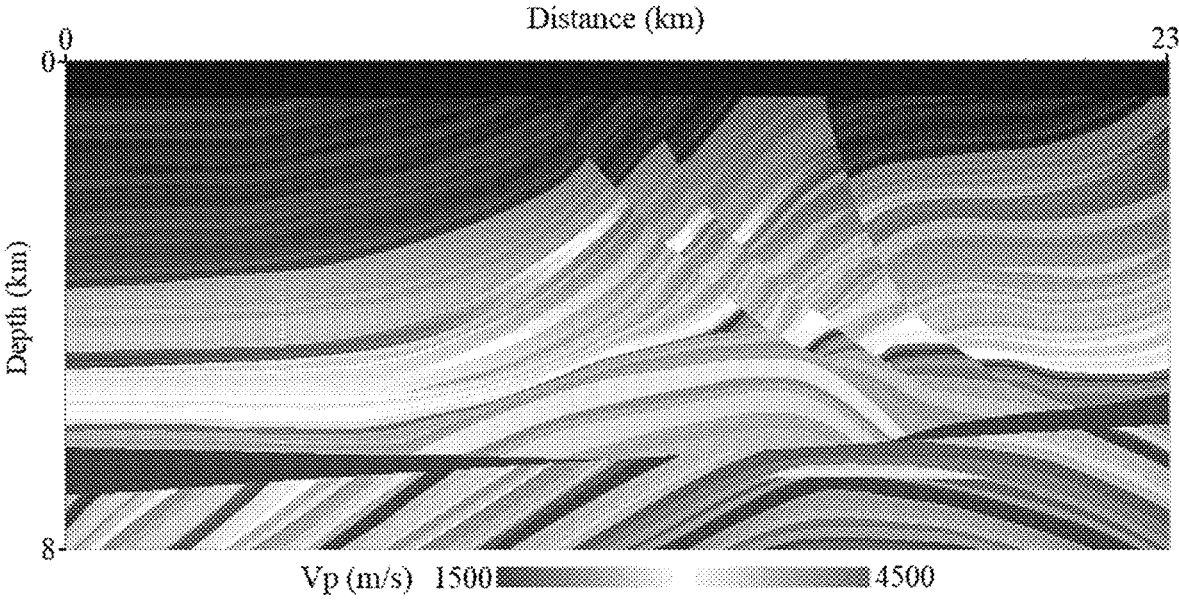
FIG. 8 shows the true velocity model with grid space of 50 m, used for generating seismic data with maximum offset of 25 km.
Figure 9:
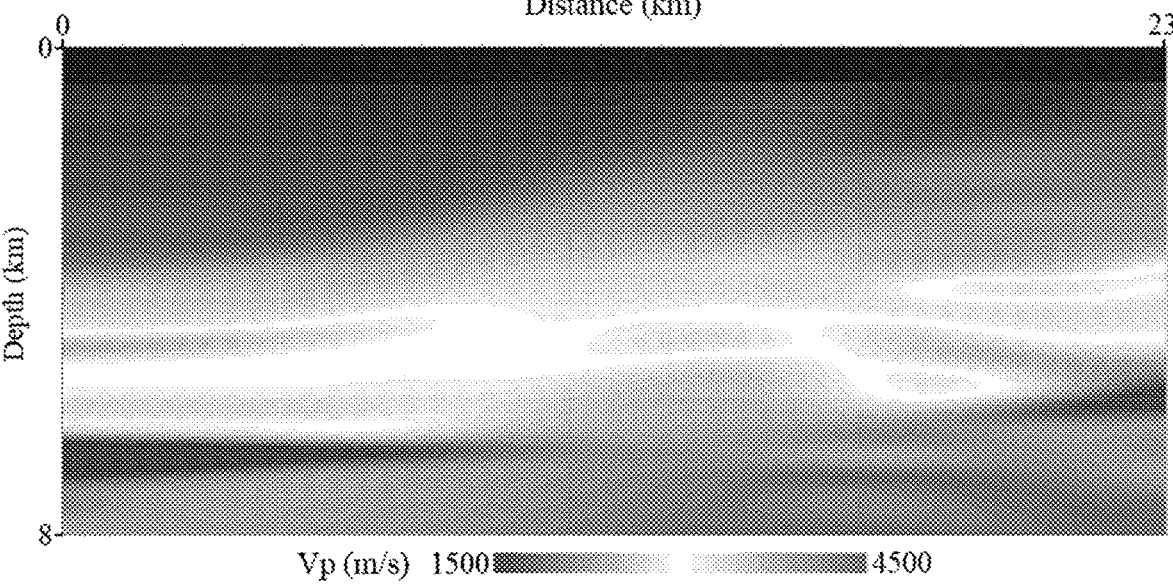
FIG. 9 shows the initial velocity model for FWI tests.
Figures 10, 11:
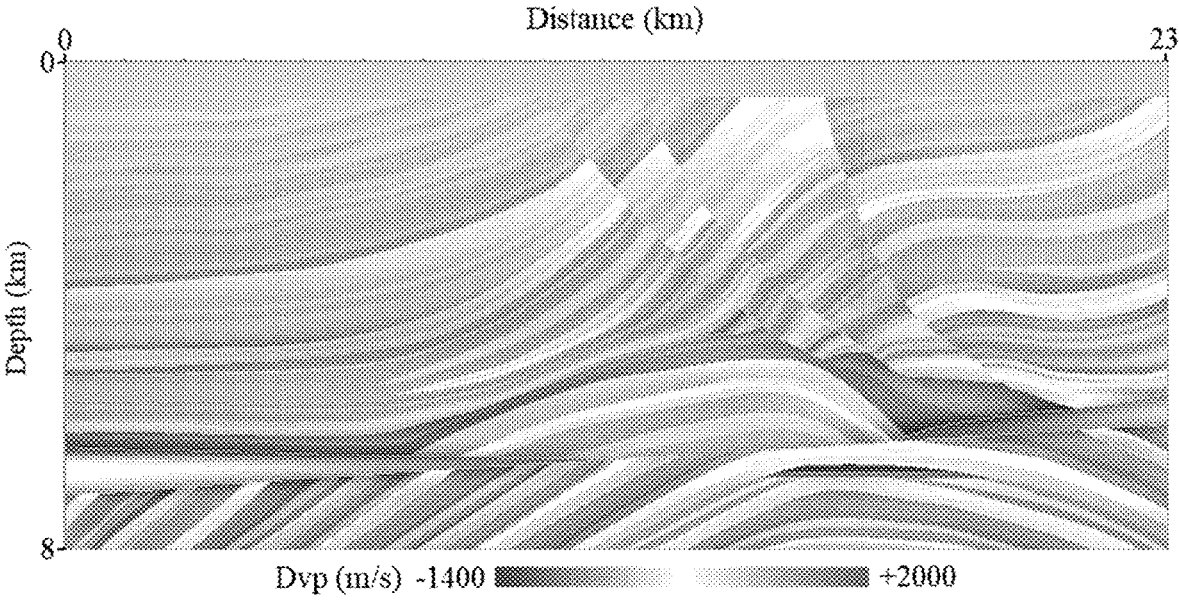
FIG. 10 shows velocity differences obtained by subtracting the initial velocity model in FIG. 9 from the true velocity model in FIG. 8, which range from about-1365 m/s to 1980 m/s.
FIG. 11 shows the inverted velocity model using the invented adaptive cross-correlation FWI method with bandpass filtered 2.5 Hz data, assuming the effective lowest frequency is 2.5 Hz and lower frequencies are not available in the observed data.

FIGS. 8-17 demonstrate that the method disclosed herein can invert high resolution subsurface velocity details while avoiding cycle skipping. FIG. 8 shows the true velocity model with grid space of 50 m used for generating seismic data with maximum offset of 25 km. FIG. 9 shows the initial velocity model for FWI, which is a Marmousi model. In this inversion, the medium parameters m have only one parameter, the propagation velocity $V_P$. The data used in this FWI are generated by the true Masmousi model in FIG. 9 with an Ormsby wavelet. The velocity differences in FIGS. 8 and 9 are in the same range of 1500 m/s to 4500 m/s. FIG. 10 shows velocity differences obtained by subtracting the initial velocity model in FIG. 9 from the true velocity model in FIG. 8. The velocity difference in FIG. 10 ranges from about −1365 m/s to 1980 m/s.

Figure 12:
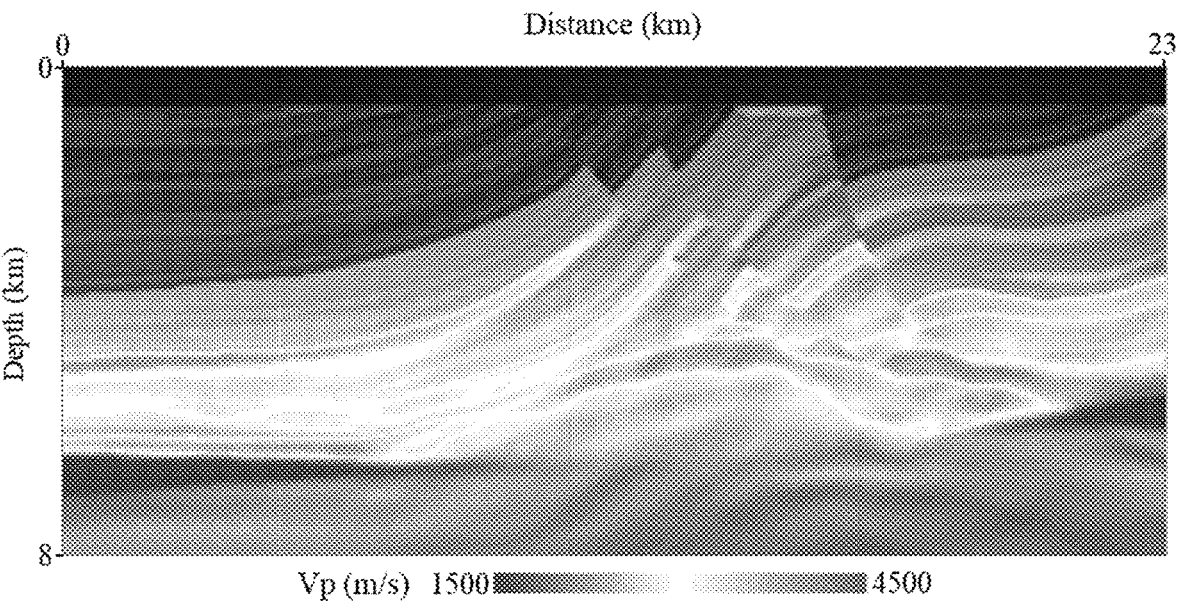
FIG. 12 shows the finally inverted velocity model using the invented adaptive cross-correlation FWI method with successively bandpass filtered 2.5 Hz, 4 Hz, 6 Hz, and 10 Hz data.

FIG. 11 shows the inverted velocity model using the inventive adaptive cross-correlation FWI method of FIG. 6 with bandpass filtered 2.5 Hz data, assuming the effective lowest frequency is 2.5 Hz and lower frequencies are not available in the observed data. FIG. 12 shows the finally inverted velocity model using the inventive adaptive cross-correlation FWI method of FIG. 6 with successively bandpass filtered 2.5 Hz, 4 Hz, 6 Hz, and 10 Hz data.

Figure 13:
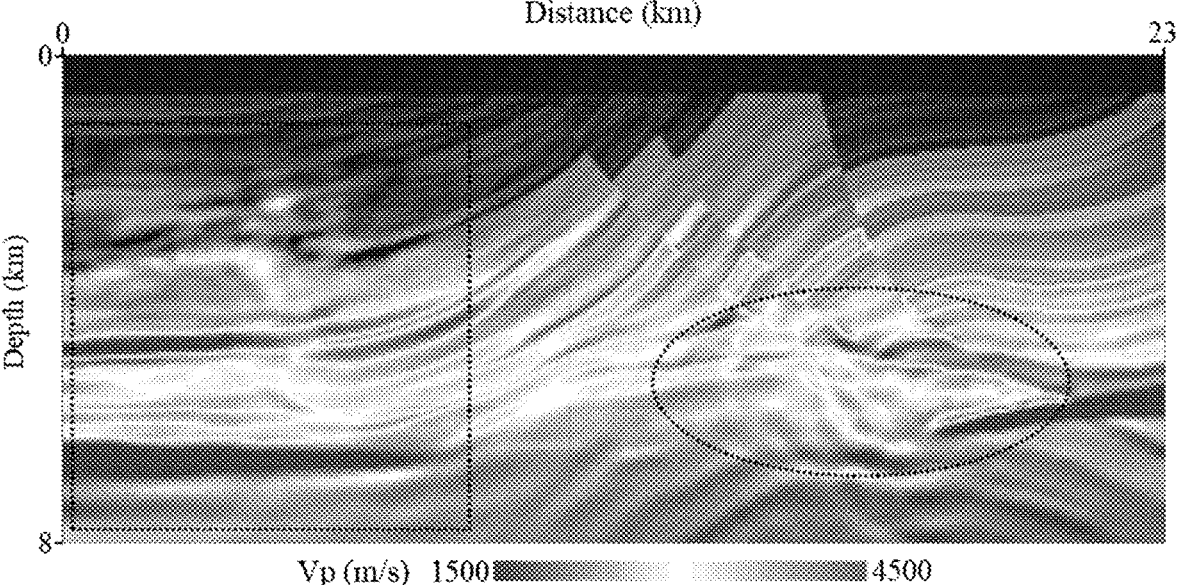
FIG. 13 shows the finally inverted velocity model using the conventional L2 waveform difference based FWI method with the same successively bandpass filtered 2.5 Hz, 4 Hz, 6 Hz, and 10 Hz data.

FIG. 13 shows the finally inverted velocity model using the conventional L2 waveform difference based FWI method according to equation (4). FIG. 13 has the same successively bandpass filtered 2.5 Hz, 4 Hz, 6 Hz, and 10 Hz data. Comparing FIG. 13 with FIG. 12, one can readily see the inversion artifacts in the area enclosed by the rectangle as well as the wrong updating direction in the area enclosed by the ellipse due to cycle skipping.

Figure 14:
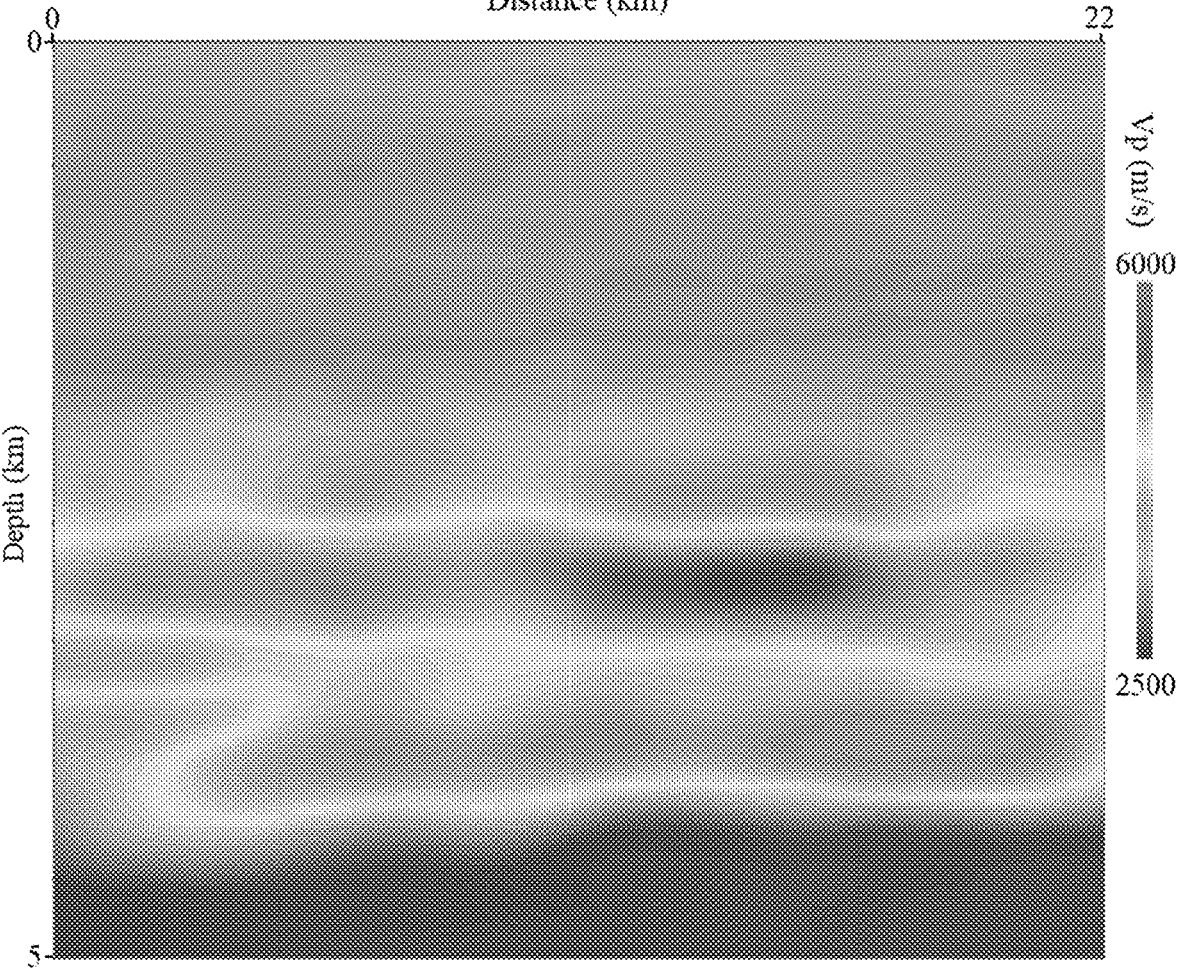
FIG. 14 shows the velocity model of the real land dataset generated from ray-based tomography, which will serve as the initial velocity model of FWI.
Figure 15:
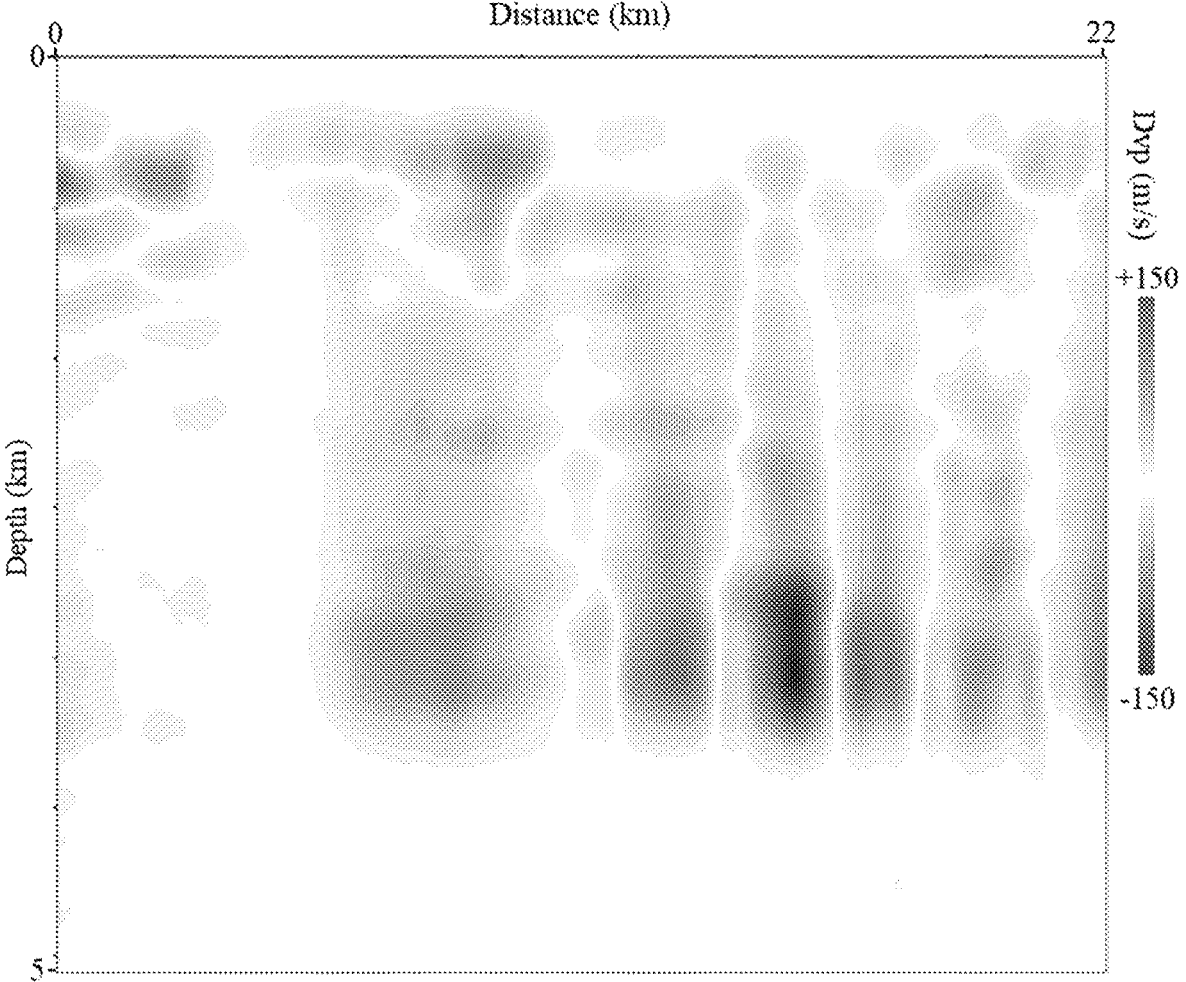
FIG. 15 shows the inverted model perturbations (differences between the inverted model by FWI and the initial model by tomography), which are inverted using the invented adaptive cross-correlation based FWI method.

FIG. 14 shows the inverted velocity model from the real land dataset using the ray-based tomography. FIG. 15 shows the inverted model perturbations (differences between the inverted model by FWI and the velocity model by tomography), which are inverted using the inventive adaptive cross-correlation based FWI method shown in FIG. 6.

Figure 16:
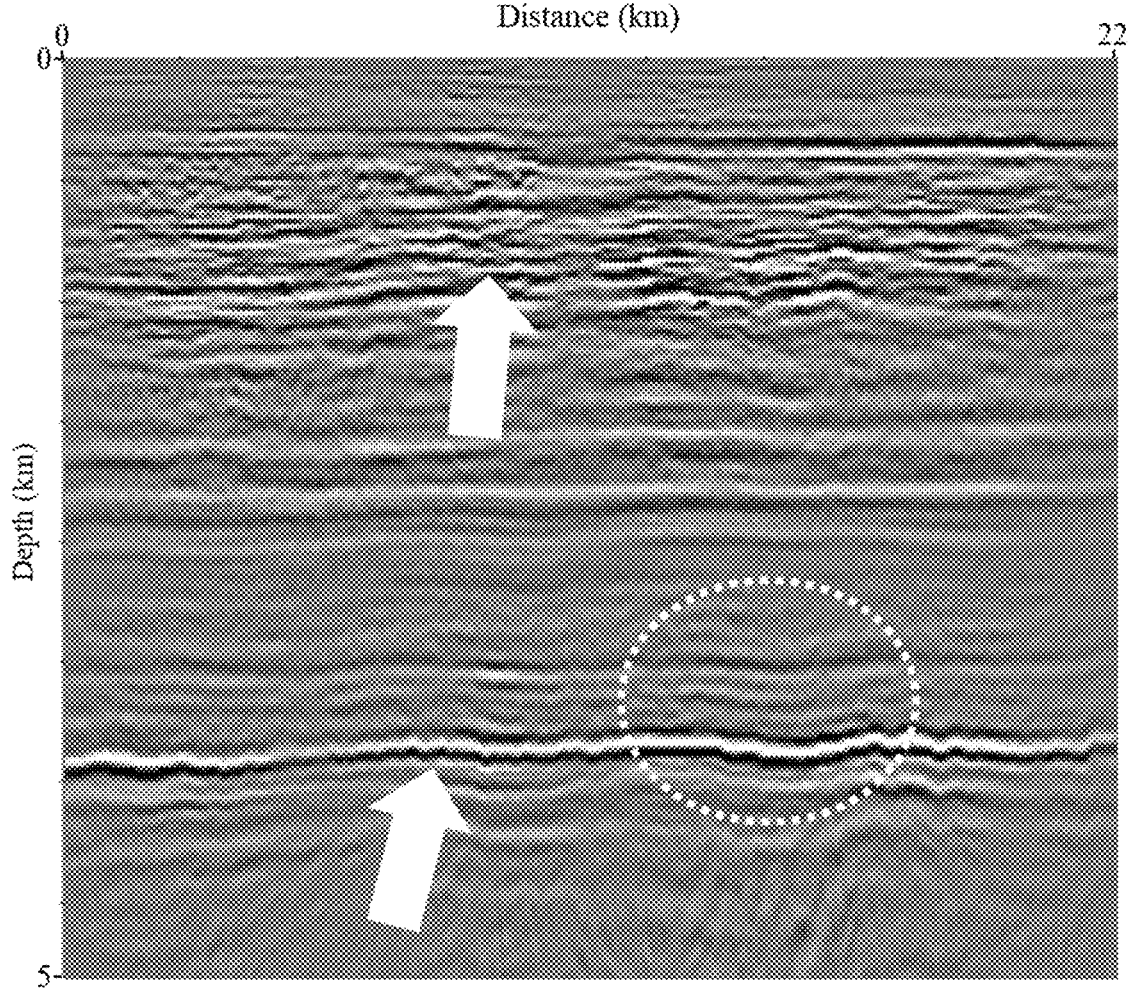
FIG. 16 shows seismic migration image obtained using the initial ray-based tomography model.
Figure 17:
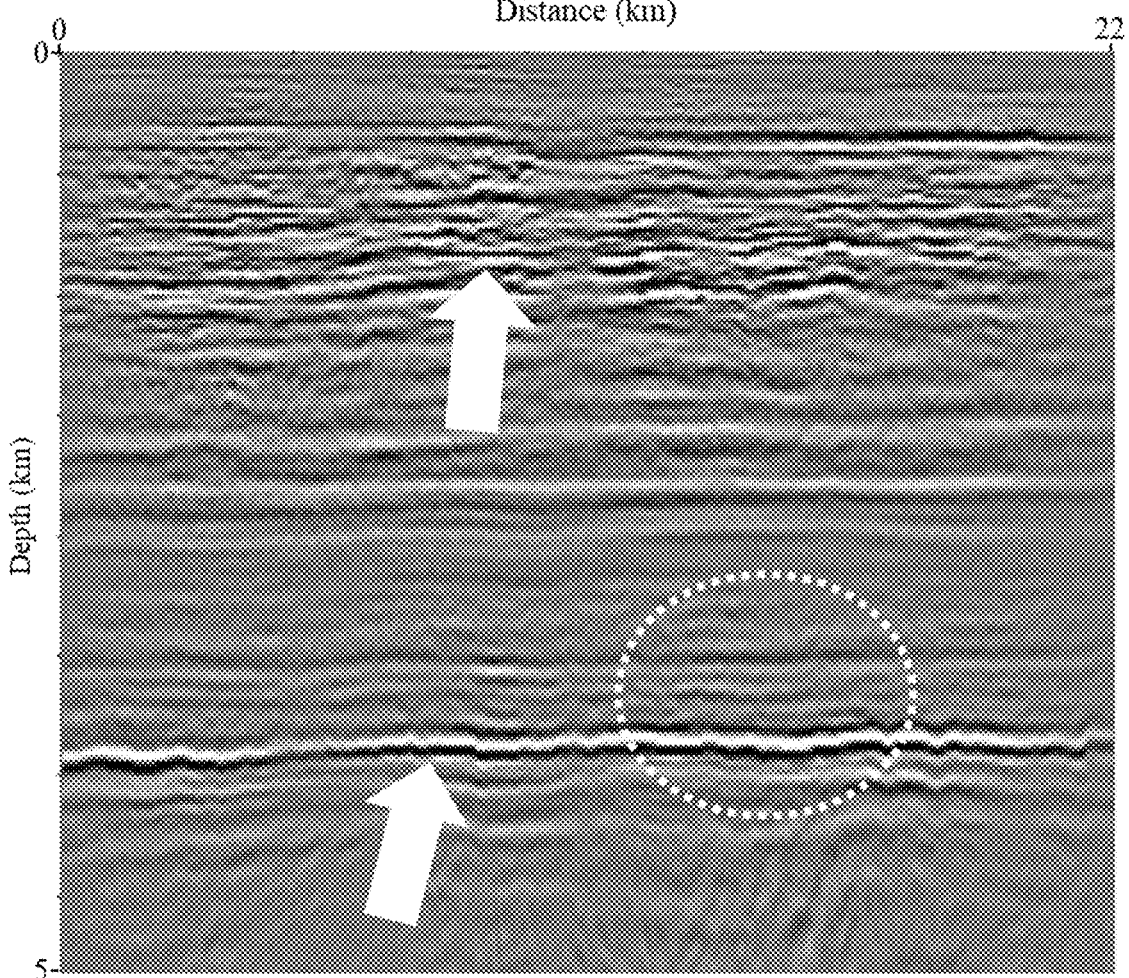
FIG. 17 shows a seismic migration image obtained using the inverted velocity model by the invented adaptive cross-correlation FWI method.

FIG. 16 shows seismic migration image obtained using the initial ray-based tomography model, while FIG. 17 shows a seismic migration image obtained using the inverted velocity model by the inventive adaptive cross-correlation FWI method shown in FIG. 6. Comparing the areas pointed to by the arrows or encircled by the eclipse, the geological features are smoother and better defined in FIG. 17, demonstrating the effectiveness of the inventive method.

Accordingly, even though FIGS. 16 and 17 show a land data example with unknown true source wavelets for different shot records and use an Ormsby wavelet for forward modeling, the inventive method depicted in FIG. 6 successfully updates the velocity model for improving seismic images with better geological interpretations, which shows robustness of the inventive method, particularly in case that true wavelets for different shots of land data are not known.

Although the embodiments herewith disclosed, described a FWI algorithm with a traveltime (difference) misfit function, utilizing finite-difference numerical solution of the scalar acoustic wave equation for seismic propagation. It would be apparent to a person having ordinary skills in the art that it can also be alternatively applied to vector wave equations and elastic equations, in both isotropic and anisotropic media, without departing from the true scope of the invention, as defined in the claims set forth below.

I claim:

1. A method for performing a seismic full waveform inversion to generate a velocity model of subsurface formations of a survey region, comprising:
  (a) positioning seismic data recording sensors at a plurality of locations in the survey region and positioning a well logging tool having seismic data recording sensors in a well bore in the survey region;
  (b) emitting at points of incidence in the survey region to generate seismic waves, which travel through subsurface earth formations;
  (c) observing the seismic waves and recording observed seismic data based on the seismic waves using the seismic data recording sensors positioned at the plurality of locations and/or disposed in the well logging tool in the well bore;
  (d) transmitting the observed seismic data from the seismic data recording sensors to a computer system including one or more memories, storing the observed seismic data in the one or more memories, and storing a source wavelet and a current medium parameter model in the one or more memories;
  (e) performing, by the computer system, a forward modeling operation using the source wavelet and the current medium parameter model according to a forward wave equation and obtain a forward wavefield to generate synthetic data based on the forward wave equation;
  (f) processing, by the computer system, the synthetic data and the observed seismic data using a Hann window operation, respectively, to obtain a localized synthetic data and a localized seismic data;
  (g) selecting, by the computer system, a traveltime difference based on a cross-correlation between the localized synthetic data and the localized seismic data;
  (h) solving, by the computer system, an adjoint equation of the forward wave equation using the traveltime difference and the localized seismic data to obtain an adjoint source;
  (i) generating, by the computer system, an updated medium parameter model for the seismic full waveform inversion and synthetic data using the forward modeling operation;
  (j) performing operations (e) to (i) until convergence;
  (k) outputting the updated velocity as a final velocity model to a display upon the convergence; and
  (l) displaying an image of the final velocity model on the display of the computer system.

2. The method of claim 1, further comprising constructing, by the computer system, a matching filter that matches the synthetic data and the observed seismic data.

3. The method of claim 2, wherein the synthetic data, prior to being subject to the Hann window operation, is convolved with the matching filter.

4. The method of claim 3, wherein operation (i) further comprises, by the computer system, reversely propagating the adjoint source to obtain an adjoint wavefield;
  calculating a gradient using the forward wavefield and the adjoint wavefield;
  determining a search direction and a step length; and
  updating the medium parameter model with the step length.

5. The method of claim 1, wherein the convergence is obtained when a value of a traveltime based misfit function is less than a predetermined value.

6. The method of claim 1, wherein the convergence is obtained when a number of iterations reaches a predetermined value.

7. The method of claim 1, wherein the medium parameter model is selected from a velocity model.

8. The method of claim 1, wherein the source wavelet is an Ormsby wavelet or a Ricker wavelet.

9. The method of claim 2, wherein the matching filter is a Wiener filter.

10. The method of claim 4, wherein the updating step uses an inversion method selected from a steepest-descent algorithm, a nonlinear conjugate gradient method, a Gaussian Newton's method, and a quasi-Newton's method.

11. A system for performing a seismic full waveform inversion to generate a velocity model of subsurface formations of a survey region, the system comprising:
  a plurality of seismic data recording sensors positioned in the survey region at different locations and/or a well logging tool including having seismic data recording sensors positioned in a well bore in the survey region; and
  a blasting device positioned at each a point of incidence in the survey region to generate seismic waves, which travel through subsurface earth formations,
  wherein:
  the plurality of seismic data recording sensors and/or the seismic data recording sensors in the well logging tool positioned in the well bore are configured to sense seismic waves and record seismic data based on the seismic waves and to transmit the seismic data to a computer system including one or more memories and at least one processor, the one or more memories are configured to store the transmitted seismic data, a source wavelet, and instructions, and the one or more processors are configured to execute the instructions stored in the one or more memories to implement:

performing a forward modeling operation using the source wavelet and a current medium parameter model according to a forward wave equation to obtain a forward wavefield; processing a synthetic data and an observed seismic data to Hann window operation, respectively, to obtain a localized synthetic data and a localized seismic data;

selecting a traveltime difference based on a cross-correlation between the localized synthetic data and the localized seismic data;

solving an adjoint equation of the forward wave equation using the traveltime difference and the localized seismic data to obtain an adjoint source; and generating an updated medium parameter model for the seismic full waveform inversion and synthetic data using the forward modeling operation.

\* \* \* \* \*